United States Patent [19]

Goldman

[11] Patent Number: 4,635,054

[45] Date of Patent: Jan. 6, 1987

[54] OPERATOR INTERACTIVE DEVICE VERIFICATION SYSTEM

[75] Inventor: Robert N. Goldman, Honolulu, Hi.

[73] Assignee: Light Signatures, Inc., Los Angeles, Calif.

[21] Appl. No.: 753,737

[22] Filed: Jul. 10, 1985

[51] Int. Cl.[4] .......................... H04Q 9/00; G06K 5/00
[52] U.S. Cl. ................................. 340/825.34; 235/487
[58] Field of Search ...................... 340/825.35, 825.33, 340/825.34; 235/487

[56] References Cited

U.S. PATENT DOCUMENTS

| | | | |
|---|---|---|---|
| 3,764,742 | 10/1973 | Abbott et al. | 340/825.3 |
| 4,281,215 | 6/1981 | Martin | 340/825.34 |
| 4,315,101 | 2/1982 | Martin | 340/825.34 |
| 4,386,266 | 5/1983 | Chesarek | 340/825.34 |
| 4,423,415 | 12/1983 | Goldman | 340/825.34 |
| 4,476,468 | 10/1984 | Goldman | 340/825.34 |
| 4,489,318 | 12/1984 | Goldman | 340/825.34 |

FOREIGN PATENT DOCUMENTS 1546053 5/1979 Switzerland .

Primary Examiner—Donald J. Yusko
Attorney, Agent, or Firm—Nilsson, Robbins, Dalgarn, Berliner, Carson & Wurst

[57] ABSTRACT

A verification system is disclosed in conjunction with a card having a uniqueness characteristic for avoiding counterfeits. A magnetic stripe on the card records encoded combination data based on the uniqueness characteristic and personal identification data of the assigned bearer. The card is sensed to provide fresh observations of the uniqueness characteristic along with data from the magnetic stripe. An operator interacting with the system provides his personal identification data. The magnetic stripe data is combined with the operator-provided personal identification data to derive a decoded indication of the uniqueness characteristic. Such a uniqueness characteristic is compared with the freshly sensed uniqueness characteristic as a basis for verifying the authenticity of both the personal identification data and the card. The system further incorporates structure for modifying the personal identification data by interaction between the system and a proper operator.

10 Claims, 4 Drawing Figures

OPERATOR INTERACTIVE DEVICE VERIFICATION SYSTEM

BACKGROUND AND SUMMARY OF THE INVENTION

Various authorization devices, as in the form of cards, have come into widespread use to perform specific functions in association with an assigned person. For example, credit cards, debit cards, secure access cards, and so on are used in various systems by assigned holders to perform a variety of control functions. Credit cards might be employed to support a financial transaction as authorizing cash from an automatic teller machine. Secure access cards might be employed to regulate persons entering specific areas or accessing restricted computer data. Of course, various other applications and control functions are well known for which cards or the like have been prepared and issued.

Generally, schemes that utilize cards for control are subject to misuse primarily in two aspects. First, a card assigned to one person may fall into the hands of another person with the consequence that an improper holder fraudulently uses the card. Also, counterfeits are perpetually a threat for systems that utilize cards for restrictive control over a card bearer.

To combat counterfeit cards, it has been proposed to utilize cards with a unique characteristic that can be sensed to verify the card as authentic. One form of such a card is disclosed in U.S. Pat. No. 4,423,415, issued Dec. 27, 1983, to R. N. Goldman. The patent also discloses an illustrative system for verifying the authenticity of cards with a uniqueness characteristic. Of course, various forms of the uniqueness characteristic in cards and the like have been proposed for combating counterfeits.

While techniques utilizing a uniqueness characteristic of cards have been recognized as effective in combating counterfeits, systems embodying such technology may still encounter the problem of genuine cards being lost or stolen and subsequently misused. As a safeguard to such an occurrence, it has been proposed to utilize a personal identification number (PIN) in conjunction with an assigned card. For example, the bearer of a card commits a personal identification number (PIN) to memory and the number is also carried as a reference in computer memory. Upon presenting his card, the bearer gives his personal identification number for testing against the reference. Coincidence between the stated and reference PINs results in approval of a card-supported transaction. While such personal identification numbers have been effectively used in the past, their use has not been without certain difficulties.

If personal identification numbers are created by a card-issuing organization and communicated to the assigned card holder, the PIN designation likely has no mnemonic value to the holder. Consequently, he may forget the number or make a record of it which poses a constant threat to limited use of the card. Alternatively, if the personal identification number is selected by the card holder, it likely appears in a number of documents involved in the processing of the card and again security may be jeopardized. Furthermore, any communication of the personal identification number involves some exposure. In the past, systems have been proposed for safeguarding personal identification numbers to some extent. For example, see U.S. Pat. No. 4,281,215, issued June 28, 1981 to Martin et al. and U.S. Pat. No. 4,315,101, issued Feb. 9, 1982 to the same person. See also U.S. Patent No. 4,386,266, issued May 31, 1983 to Donald I. Chesarek.

In relation to prior systems generally, if a card holder inadvertently discloses his personal identification number or suspects that it has been learned by someone else, no expedient procedure exists for changing the number. Essentially, the holder must apply for a change and await receipt of a fresh card with the attendant processing exposure.

As another consideration, most traditional card systems utilizing personal identification numbers operate in association with a central computer for registering individual personal identification numbers. In addition to the risks of communicating the personal identification numbers, such systems necessitate on-line operation and involve substantial processing time and cost.

In another arrangement, it has been proposed to avoid on-line operation by incorporating microchips on cards which chips register the personal identification number of an assigned user, see U.S. Patent No. 3,764,742, issued Oct. 9, 1973 to George F. Abbott et al. Unfortunately, such cards may still compromise the personal identification number in view of the possibility that the number might be extracted from the card using electronically sophisticated techniques. Accordingly, a need exists for an improved form of transaction card or the like, which is susceptible to off-line use, which involves a minimal record of the personal identification number, and which facilitates convenient change of the personal identification number, all for use in conjunction with a processing system for effective and reliable control operations.

In general, the system of the present invention involves a card, and a processing system for the card which may function off-line. The card of the present invention possesses an anticounterfeit uniqueness characteristic and an encoded record of a test value obscurely including the personal identification number and the uniqueness characteristic. The system of the present invention processes cards by sensing the encoded record test value and the card uniqueness characteristic value. The personal identification number is input to the system, as by a manual keyboard. In one format, the PIN is combined with the record encoded test number to produce a value that is tested against the freshly sensed uniqueness characteristic value. Coincidence indicates an authentic card and proper card holder. Change of the personal identification number involves sensing the combination value, subtracting the PIN that is to be eliminated and adding the new PIN to form a new combination test value for recording.

DESCRIPTION OF THE ILLUSTRATIVE EMBODIMENT

As indicated above, a detailed illustrative embodiment of the present invention is disclosed herein. However, specific card formats, data sensors, media uniqueness characteristics and operating structures in accordance with the present invention may be embodied in a wide variety of different forms, some of which may be quite distinct from those of the disclosed embodiment. Consequently, the specific structural and functional details disclosed herein are merely representative, yet in that regard they are deemed to afford the best embodiment for purposes of disclosure and to provide a basis for the claims herein which define the scope of the present invention.

Figure 1:
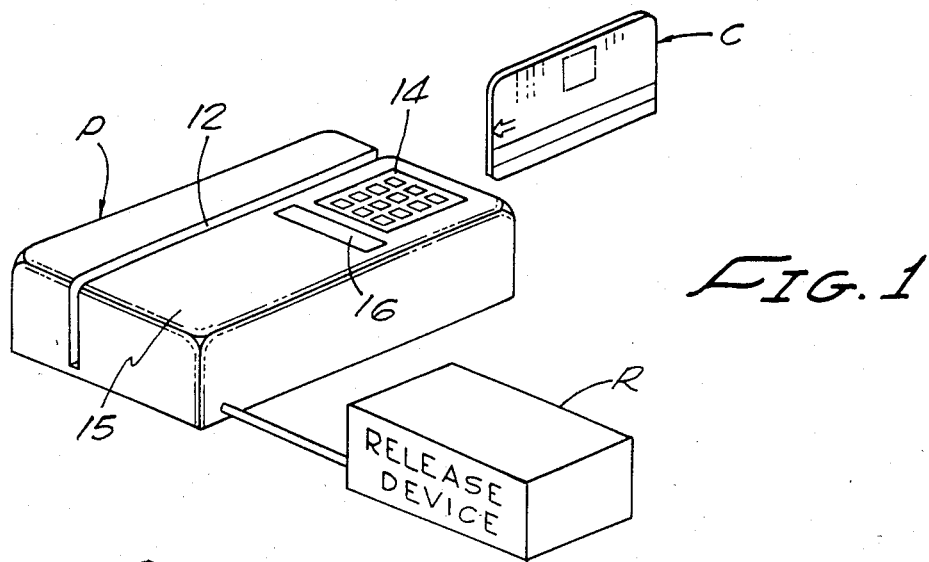
FIG. 1 is a perspective view of a card and processing apparatus constructed in accordance with the present invention.

Referring initially to FIG. 1, an anticounterfeit card C is represented which may be repeatedly sensed for verification on the basis of a uniqueness characteristic and a personal identification number. As illustrated, the card C is positioned preparatory to be moved through a processor or terminal transducer apparatus P.

As the card C is manually passed through the transducer apparatus P, data is sensed in the form of electrical signals for manipulation and combination with other signals developed in the apparatus P. As a consequence the card C may be verified as authentic when presented along with a correct personal identification number (PIN). In that event, signals are supplied from the transducer apparatus P to a release device R which may take a wide variety of different forms depending on the nature of the application. In one form, the release device R may simply signal the authentication of the card C. Alternatively, for example, the device R may initiate some positive action, as the release of a lock.

Considering the system as represented in FIG. 1 in somewhat greater detail, the transducer apparatus P is generally of a parallelepiped configuration defining an open uniform slot 12 extending the length of the apparatus. Transducer devices (as disclosed below) are fixed in the apparatus P adjacent the slot 12 to act on the card C as it passes through the apparatus P.

The transducer apparatus P also incorporates a keyboard 14 constituting twelve push buttons configured in an alphanumeric relationship in accordance with a traditional telephone instrument. Accordingly, alphabetic or numeric designations can be signal represented. Below the keyboard 14 on the upper panel 15 of the apparatus P, a display window 16 exhibits information to guide and assist the user.

Generally, in using his card C, an assigned card holder interacts with the system of FIG. 1 by actuating the keyboard 14 and moving his card C through the slot 12. The data from the card C is sensed and registered in the processor or transducer apparatus P. The user actuates the keyboard 14 to temporarily register his personal identification number (PIN) within the apparatus P. The system manipulates the received data to verify that the card is genuine and that the personal identification number is correct. Upon such an occurrence, the release device R is actuated. The PIN number is then cleared. It is important to note that no record of the personal identification number remains in the system.

As treated in detail below, the system also accommodates the user in changing his personal identification number. As a related consideration, it also is important to recognize that the system of FIG. 1 may operate effectively in an off-line configuration.

Figure 2:
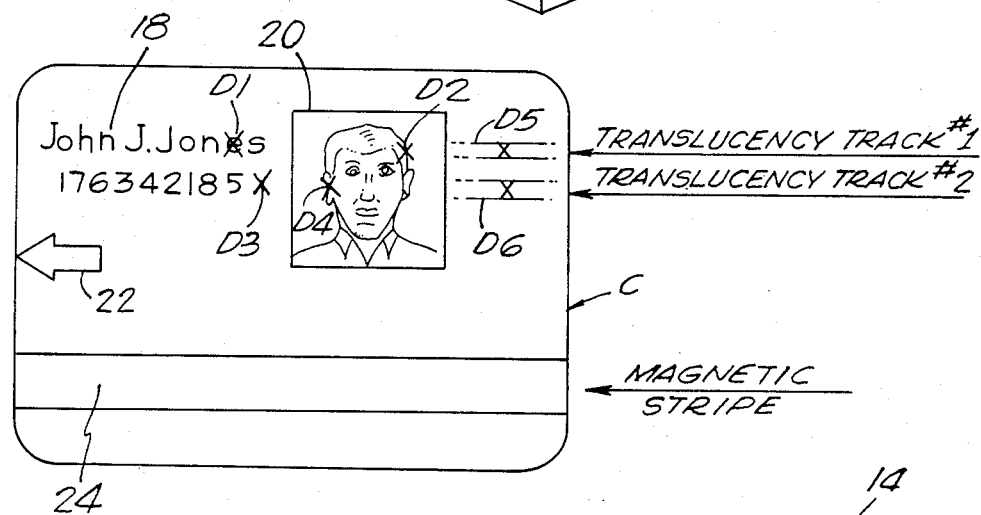
FIG. 2 is an enlarged plan view of the card illustrated in FIG. 1.

Considering the system in somewhat greater detail, reference will now be made to FIG. 2 illustrating the card C in substantial detail. Of course, the card may take a variety of different forms as disclosed in the referenced U.S. Pat. No. 4,423,415, to R. N. Goldman, or U.S. Pat. No. 4,476,468, issued Oct. 9, 1984, to the same inventor. Other card formats also may be employed; however, an important consideration resides in the fact that the card of the present invention has an associated alterable record, as a magnetic stripe, and a uniqueness characteristic, both of which can be repeatedly sensed for authentication of the card.

In the illustrative embodiment, the card C comprises paper with a varying opacity pattern as the uniqueness characteristic. The card C carries print 18 (upper left) indicating the name of the assigned holder, and a photographic likeness 20 (right) of the assigned holder. The print 18 and the likeness 20 may be variously deposited or printed on a sheet of bond paper as well known in the prior art along with any other desired designations as, for example, an arrow 22 indicating the direction that the card is to be moved through the slot 12 (FIG. 1). The card may be laminated, as in a protective plastic cover, as well known in the art.

The indicia on the card C, e.g. the print 18 and likeness 20, as well as any laminations, may alter the translucency or opacity of the inherent material of the card C at certain locations, modifying the uniqueness characteristic to some extent. However, in the disclosed embodiment, the uniqueness characteristic is the total translucency of the card C which depends to some extent on the inherent characteristic of the media in the card C.

As indicated, the card C also includes a magnetic stripe 24 in a form as well known in the prior art for recording substantial data. As disclosed in detail below, the magnetic stripe 24 is sensed by the transducer apparatus P (FIG. 1) concurrently with the sensing of the anticounterfeit characteristic (translucency) of the card taken along the tracks 1 and 2 designated in FIG. 2. Note that the uniqueness characteristic as employed in the disclosed embodiment constitutes the transparency or opacity of the card C at six discrete locations D, specifically identified by cross symbols designated D1, D2, D3, D4, D5, and D6. Of course, alternatively, the verification tracks may be in an unobstructed or clear area of the card. Also, printed information on the card may be duplicated in the stripe and displayed for confirmation.

Generally, the processing of the card C in accordance herewith involves repeatedly sensing the uniqueness characteristic at the locations D for comparisons. Thus, the uniqueness characteristic is tested each time the card is verified. Such testing is integrally related with a test of the personal identification number (PIN) as indicated by the person presenting the card.

It is important to appreciate that the uniqueness characteristic is quite obscure in that the locations D are not apparent, nor are the tracks 1 and 2, nor is the sensing format. Furthermore, in accordance herewith, though the personal identification number might theoretically be derived from the card C, such derivation would be complex and difficult by reason of the obscurity of the uniqueness characteristic which also is exceedingly difficult to counterfeit. An explanation of an exemplary processing of the data will illustrate the operations.

Assume a simplistic case for example, one in which the personal identification number (PIN) for use with the card C is derived from the assigned holder's name, specifically: "3JOHNJ".

Figure 3:
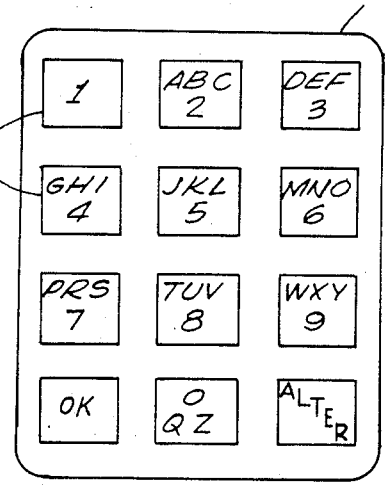
FIG. 3 is a plan view of a keyboard as depicted in the apparatus of FIG. 1.

Applying the conventional telephone dial format, such an alphanumeric personal identification number is resolved to decimal digits: PIN="356465". FIG. 3 shows the keyboard 14 in detail for making such a translation. Specifically, the keyboard 14 incorporates an array of pushbuttons 27, ten of which bear the numerical designations 0 through 9. The remaining pair of buttons 27 (bottom row sides) are labeled "ok" and "alter".

The numeric buttons 27 additionally carry alphabetic designations somewhat in accordance with the traditional telephone standard. Specifically, for example, the numerical button "2" also carries alphabetic letters "A", "B", and "C". Accordingly, depressing that button provides an ambiguous signal which is representative of either: "2", "A", "B", or "C". Thus, alphabetic characters can be simply converted to a decimal format albeit the format is ambiguous and irreversible. Note that the letters Q and Z normally missing from the traditional telephone format, are provided on the "0" button.

To continue with the exemplary operation, converting the resulting decimal PIN value "356465" to a standard binary format renders:

PIN+0011 0101 0110 0100 0110 0101

Thus, when John J. Jones uses his card C, he activates the keyboard 14 (FIG. 1) depressing the buttons "3JOHNJ" ultimately to produce the above binary PIN value which is stored temporarily in the transducer apparatus P as representative of his personal identification number.

For cooperative use with the value PIN, as indicated above, the card C (FIG. 1) has a uniqueness characteristic. In the illustrative embodiment, the characteristic is reduced to numerical data D by sensing the translucency of the card C at the similarly designated locations D. Exemplary detailed structure for such an operation is disclosed in the referenced Goldman patent U.S. Pat. No. 423,415. In accordance therewith, the observation of the six locations D produce six four-bit binary numbers, specifically, for example:

D=0010 1000 0010 0011 0110 0001.

Recapitulating to some extent, in the use of the card C, two sets of data are provided, i.e. the personal identification number PIN (six binary-coded decimal digits) and the representative uniqueness characteristic data or number D in the same format. Confirmation of both numbers is important to authenticate the card as genuine and the holder as proper.

The test for the card and user authentication employs numerical test data recorded on the magnetic stripe 24. Specifically, the magnetic stripe 24 records a derived or encoded numerical test value T which when combined with the personal identification data PIN provides a value equal or approximately equal to the uniqueness characteristic data D as freshly observed. An example using the numbers considered above will illustrate the principle.

Assume, for example, that the magnetic stripe 24 produces a binary test number:

T=0001 1101 0100 0111 0000 0100.

Now assume that from such a number, the PIN value, as explained above is subtracted, using modulo two subtraction to provide the possible characteristic value D' as previously sensed. Specifically, Test No. T:          0001 1101 0100 0111 0000 0100
PIN:               − 0011 0101 0110 0100 0110 0101
Characteristic D':   0010 1000 0010 0011 0110 0001

In a proper case, the resultant number D' from the arithmetic subtraction statistically coincides to the characteristic value number D assumed above as representing the card C. Accordingly, the subtractive combination produces a number D' representing the uniqueness characteristic. Consequently, with a favorable comparison of the uniqueness values D' (recorded) and D (freshly sensed), both the personal identification number and the uniqueness characteristic are confirmed, yet neither number is directly available from the card C. Consequently, although the personal identification number and the uniqueness characteristic number are quite obscure, by the present invention, their effective testing is afforded to confirm both the authenticity of the card C and the propriety of the personal identification number.

In addition to the secure PIN number feature of the system, as indicated above, another feature allows a card holder to change his PIN number at will. Both operations are disclosed in the illustrative embodiment. In that regard, a test operation is performed by the system of FIG. 1 when the user actuates the "ok" button 27 (FIG. 3) seeking approval. The operation of altering his PIN number involves actuating the "alter" button 27.

As indicated above, the selection of operations between a test to seek approval and a change of the PIN is commanded by selectively actuating either the button "ok" or "alter". Once either operation is actuated, a latch is set dedicating the system to the selected operation for a time.

Figure 4:
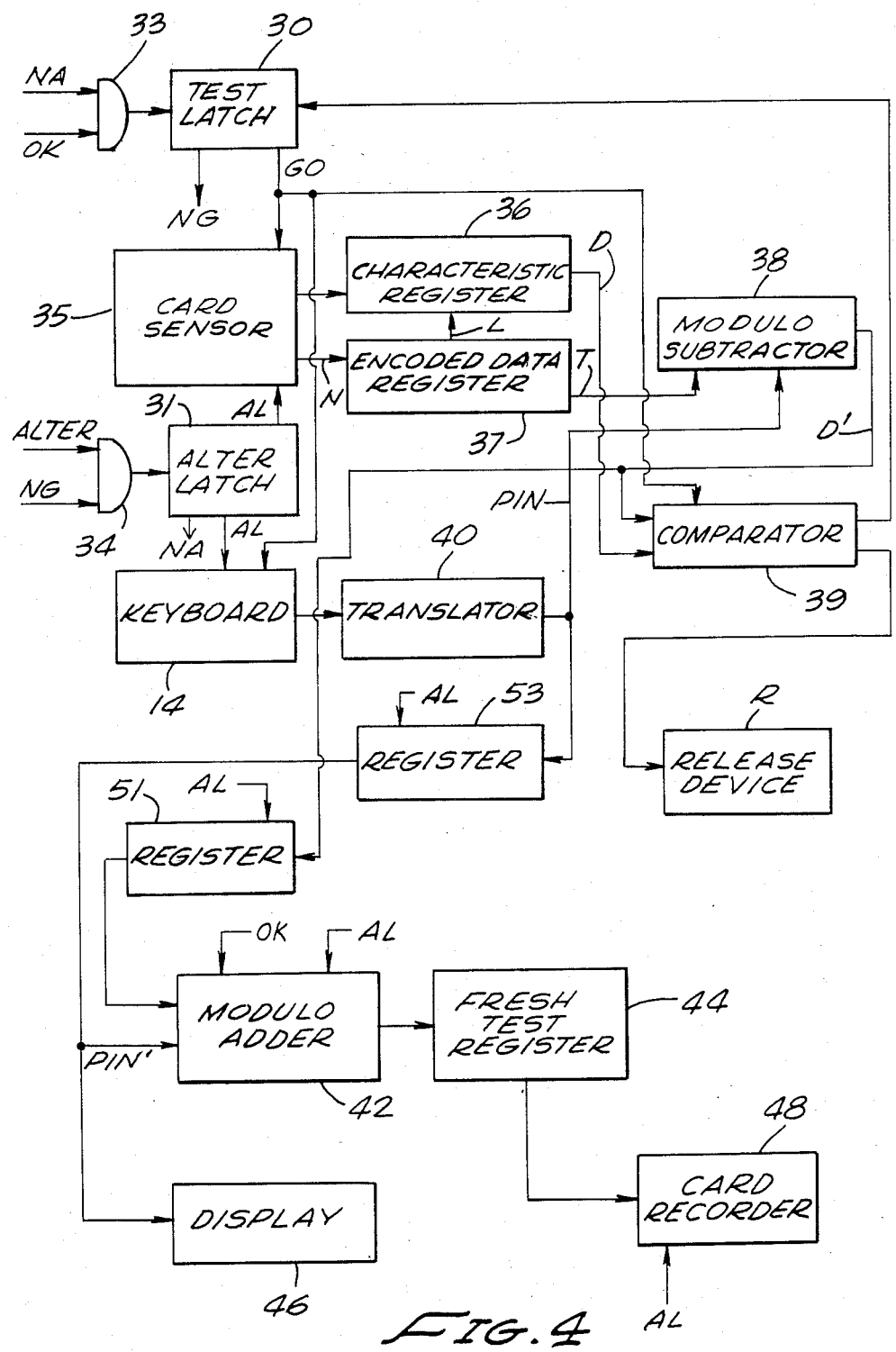
FIG. 4 is a block diagram of an electrical system incorporated in the apparatus of FIG. 1.

To consider the detailed operation of the system, reference will now be had to FIG. 4. In that regard, the following signal designations are used with reference to the system of FIG. 4 in relation to data and representative signals.

M—Record from magnetic stripe 24 including data L and T
L—Data specifying locations D1, D2, D3, D4, D5, and D6
T—Test number, e.g. uniqueness characteristic (D'+PIN)
T'—Fresh test number
D'—Previously sensed values of locations D1, D2, D3, D4, D5, and D6 (decoded as T-PIN)
D—Currently sensed values of locations D1, D2, D3, D4, D5, and D6
PIN—Personal identification number
AL—Push button command signal to alter PIN (set by latch 30)
GO—Push button signal to test card as for actuating a release device (set by latch 31).

Note that the indicated additions and subtractions are in modulo two arithmetic.

The instant functional operation of the system of FIG. 4 is determined by one of a pair of latches being in a "set" state. Specifically, a latch 30 (upper left, FIG. 1) specifies the "test" operation. Alternatively, a latch 31

(left center, FIG. 1) specifies the operation of altering the PIN. The latches 30 and 31 comprise monostable binaries and are intercoupled to avoid coincident settings. Specifically, the latch 30 is set upon qualification of an "and" gate 33 by a "no alter" signal NA from the latch 31 along with a push button "ok" provided by the related button 27 (FIG. 3). Somewhat reciprocally, the latch 31 (FIG. 4) is set upon qualification of an "and" gate 34 by a "no go" signal NG from the latch 30 and an "alter" signal AL provided from the related button 27 (FIG. 3).

The latches 30 and 31 actuate a sensor 35 (FIG. 4, upper left area) that is embodied in the transducer apparatus P (FIG. 1) to sense and record on the magnetic stripe 24 (FIG. 2) and to sense the translucency tracks 1 and 2 of the card C. Various structural forms may be utilized for the card sensor 30; however, in one form, the sensors may be as disclosed in the above-reference U.S. Pat. No. 4,423,415 (Goldman).

The card sensor 35 provides signals to a characteristic register 36 and an encoded data register 37. The register 36 receives the translucency signals and the register 37 receives the magnetic track signal. The track signal provides the location data signal L for the locations D1-D6 and a test data signal T. The test number signal T is registered and supplied to a modulo subtractor 38. The location signals L are supplied to the register 36 for selection of the signal D (specifically characteristic data signals D1-D6). Thus, the freshly sensed characteristic value signal D is set in the register 36. Accordingly, the following exemplary values can be assumed in the register 32:

D1=0010

D2=1000

D3=0010

D4=0011

D5=0110

D6=0001

As indicated above, the register 37 holds the test value T which is to be combined with the personal identification number PIN to provide the representative characteristic signals D'. The combination of the signals PIN and the test signal T is performed as a modulo two subtraction in a subtractor 38 to provide the signal represented values D'. Again, T−PIN produces D' for test by a comparator 39 against a value D as freshly sensed.

As explained above, the value PIN is provided through the keyboard 14 (FIG. 3) which is represented as a block 14 in FIG. 4. Specifically, the user actuates the keyboard 14 to provide signals PIN representative of his personal identification number. Pursuing the illustrative example, the number provided would be: PIN=0011 0101 0110 0100 0110 0101. Such signals are in the binary form after passing through a translator 40 as illustrated in FIG. 4.

The signal represented values PIN from the translator 40 are applied to the subtractor 38 along with the signals T as explained above. Accordingly, the subtractor 38 performs modulo two arithmetic to process the signals subtracting the personal identification number PIN from the encoded test value T providing a value D' that should substantially coincide to the freshly sensed characteristic value D. If the comparison is favorable (to a degree) the release device R, represented as a block R in FIG. 4, is actuated.

The system of the disclosed embodiment also allows an assigned card holder to change his personal identification number at will. Such an operation may be linked for performance after verifying the card to be authentic and the current personal identification number to be proper. However, that test is not necessary in many applications of the system. Rather, it may be desirable that the legitimate holder, but only the legitimate holder, can actuate the system at will to alter the card with a fresh personal identification number.

Changing the personal identification number is a relatively simple operation. The values T and PIN are developed as explained above. Essentially, the value PIN is subtracted from the test value T leaving a value D' which can be additively combined with a freshly selected value of PIN to form a new test value T'.

In the various operations of the system of FIG. 4, the user may be prompted for sequencing actions by a display 46 (lower left) which incorporates the window 16 (FIG. 1). At this point, in view of the above preliminary explanation of the system, an enhanced understanding may now be accomplished by considering the sequence in detail using the example as treated above with representative binary values. Accordingly, assume the assigned bearer of the card C, i.e. one John J. Jones, wishes to use the card C, initially to actuate the release device R. To start, the user actuates the "ok" button (FIG. 3) which produces a signal to qualify the "and" gate 34 (FIG. 4, upper left) unless the system has not cleared a prior operating sequence as manifest by a signal NA.

Qualification of the gate 34 sets the binary or latch 30 to provide the signal GO in a high state. Note that the signals described with respect to the system of FIG. 4 are in a binary format and are described using well known conventional operating assumptions. Timing according to well known clocking techniques is also provided.

The latch 30 provides the signal GO to qualify the card sensor 35, the keyboard 14, and the comparator 39. If desired, the system may cue the operator by actuating the display 16 with an instruction to pass his card and subsequently to key in his PIN code. In any event, the user passes his card C through the slot 12 actuating the sensor 35 to provide representative signals D and T in the registers 36 and 37. The register 37 supplies the test value signals T to the modulo subtractor 38.

The subtractor 38 also receives signals representative of the PIN value from the keyboard 14. Specifically after passing the card through the transducer apparatus P, the user punches his personal identification number into the keyboard 14. The keyboard is qualified by the latch signal GO and provides the personal identification number which is reduced by the translator 40 to the binary format-number signal PIN as explained above. Accordingly, the subtractor 38 receives the derived PIN along with the test number T sensed from the magnetic stripe 24.

Performing the combination of signals T and PIN, the subtractor 38 provides a signal value D' which in a proper case coincides somewhat to the uniqueness characteristic value D of the card C. To perform the comparison, the signals D' are provided to the comparator 39 along with the signals D from the characteristic register 36. If the comparison is favorable, the comparator 39 provides a high signal to the release device R actuating the desired operation. Note that the comparator 39 also resets the latch 30 after each operation to provide the signal NG high. Also note that if desired in the specific application, the approval may be manifest in the display window 16 (FIG. 1). Normally the latch 30 will reset shortly after the operation is completed.

As an alternative to gaining approval, the user may wish to alter his effective PIN. The desire for alteration may stem from a suspicion that the PIN value has been compromised or it may result from a plan of regular change. For example, the issuing organization may assign the holder a preliminary identification number suggesting immediate modification with the first use of the card.

Consider now an example to illustrate the operation of changing the personal identification number of a card. The operation simply involves subtracting the old PIN from the test value T and adding the new PIN. The two operations are performed in two stages, i.e. old test T−old PIN=D'; D'+new PIN=new test T. Consider the operating structure.

At the outset, the user is instructed to press the "alter" button 27 (FIG. 3) to provide an "alter" signal in a high state. Accordingly, a gate 34 is qualified unless a prior operation has not cleared as would be indicated by a high value for the signal NG from the latch 30. Qualification of the gate 34 sets the alter latch 31 providing the signal NA low and the alter signal AL high. The alter signal AL actuates the card sensor 35, the keyboard 14, the modulo adder 42, a card recorder 48 (lower right), and a pair of registers 51 and 53.

With the card sensor 35 actuated, the user runs his card C through the terminal unit P to provide the magnetic stripe signal M. In this operation, the uniqueness characteristic signal D is not sensed. The test signal T (part of the signal M) is supplied to the modulo subtractor 36 with the signal PIN as explained above used to produce the recorded uniqueness signal D'. That is, using the keyboard 14 the user provides his personal identification number as explained above, represented by the signal PIN from the translator 40. Consequently, the signal D' is again generated. However, in the "alter" mode of operation, the signal D' is supplied to the register 51 actuated by the signal AL. As part of the second phase of operation, the operator next uses the keyboard to enter his new PIN. In that regard, he may be prompted by the display.

The new PIN is translated to a digital form in the translator 40 and registered in the register 53. The display 46 is driven by the register 53 to provide the user an opportunity to approve the new PIN by again depressing the "ok" button. Upon approval, the adder 42 is actuated by the signal OK to form fresh signals T' representative of a new test value. The new test value signals T' are registered in a fresh test register 44 which drives the card recorder 48. That is, the card recorder 48 is fixed in the housing 15 (FIG. 1) to record a fresh test value T' on the magnetic stripe 24 (FIG. 2).

The fresh test value, as manifest by the signals T', is recorded on the card C during a second pass through the slot 12. Thus, the operator may change his PIN designation and no record of the designation exists anyplace but on the card in his possession. Furthermore, the designation is coded with uniqueness data. Accordingly, the accessibility of the PIN from the encoded data on the card C depends to a large measure on the obscurity of the anticounterfeit uniqueness characteristic data. In the system of the present invention that data is deemed to be quite obscure by concealment of the locations at which it is sensed and the manner in which it is treated. However, as will be apparent to those skilled in the art, more elaborate encryption techniques may be employed to further obscure the personal identification number.

As indicated above, the system of the present invention may be adapted to a wide variety of different applications and installations. For example, the card C might comprise the room key for a hotel. It might comprise the key to a secure industrial area. Alternatively, the card C might comprise a financial card, as in a form employed to authorize credit transactions. Thus, it will be appreciated from the illustrative embodiment and the above comments that the system hereof is susceptible to a great number of modifications and deviations within the basic conceptual framework. Accordingly, the scope hereof is appropriately deemed to be as set forth in the claims below.

What is claimed is:

1. An operator interactive verification system for use with a card or the like, having a uniqueness characteristic and a machine transducible record, said system comprising:
    means for an operator to provide input personal identification data signals;
    means for sensing said transducible record of said card to provide transducible data signals derived from signals representing an arithmetic combination of the personal identification data and the uniqueness characteristic data of said card;
    means for sensing said uniqueness characteristic of said card to provide representative sensed characteristic data signals;
    means for arithmetically combining said personal identification data signals and said transducible data signals to provide comparison data signals clear of said personal identification data; and
    means to correlate said comparison data signals and said sensed characteristic data signals to provide representations.

2. A system according to claim 1 wherein said means for arithmetically combining comprises a modulo arithmetic unit.

3. A system according to claim 1 further including means for altering said changeable machine transducer record on said card to reflect fresh personal identification data.

4. A system according to claim 1 further including release means actuable upon the verification of said card and operator.

5. A system according to claim 1 wherein said arithmetic combination is an additive combination of said personal identification data and said uniqueness characteristic data of said card.

6. A system according to claim 5 wherein said means for arithmetically combining comprises a subtractor means.

7. A system according to claim 6 further including means for additively combining signal representations of said input personal identification data and characteristic data to provide fresh transducible data signals; and means to record said fresh transducible data signals on said machine transducible record of said card.

8. A system according to claim 7 wherein said fresh transducible data signals replace the record of prior transducible data signals.

9. A process for manipulating transaction cards or the like having a uniqueness characteristic and a machine transducible record, said cards being used in association with assigned holders, each holder having a personal identification number, comprising the steps of:
- reducing said personal identification number to representative personal identification signals;
- sensing said uniqueness characteristic of a card to provide representative characteristic signals;
- additively combining said personal identification signals and said characteristic signals to provide transducible data signals;
- recording said transducible data signals on said machine transducible record of said card; and
- testing said card and holder by reducing said personal identification number to fresh representative signals, freshly sensing said uniqueness characteristic to provide fresh characteristic signals, subtractively combining said fresh representative signals and said transducible data signals and comparing the result with said fresh characteristic signals.

10. A process for manipulating transaction cards or the like having a uniqueness characteristic and a machine transducible record, said cards being used in association with assigned holders, each holder having a personal identification number, comprising the steps of:
- reducing said personal identification number to representative personal identification signals;
- sensing said uniqueness characteristic of a card to provide representative characteristic signals;
- additively combining said personal identification signals and said characteristic signals to provide transducible data signals;
- recording said transducible data signals on said machine transducible record of said card; and
- changing said personal identification number with respect to said card by reducing a new personal identification number to new representative signals, arithmetically providing fresh transducible data signals as the additive combination of said representative characteristic and said new personal identification number and recording said fresh transducible data signals on the transducible record of said card.

* * * * *